(12) United States Patent
Hartwell et al.

(10) Patent No.: US 7,519,916 B1
(45) Date of Patent: Apr. 14, 2009

(54) METHODS FOR TAILORING A BANDWIDTH PROFILE FOR AN OPERATING ENVIRONMENT

(75) Inventors: Aaron J. Hartwell, Duvall, WA (US); David Raissipour, Issaquah, WA (US); Ronald E. Gray, Redmond, WA (US); Robert R. Novitskey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 10/462,188

(22) Filed: Jun. 16, 2003

(51) Int. Cl.
*H04N 7/173* (2006.01)
*G06F 3/048* (2006.01)

(52) U.S. Cl. ......................... 715/771; 725/95
(58) Field of Classification Search ............. 715/771; 725/95
See application file for complete search history.

(56) References Cited

U.S. PATENT DOCUMENTS

| | | | | |
|---|---|---|---|---|
| 5,793,980 | A * | 8/1998 | Glaser et al. | 709/231 |
| 6,021,433 | A * | 2/2000 | Payne et al. | 709/219 |
| 6,393,483 | B1 * | 5/2002 | Latif et al. | 709/226 |
| 6,502,131 | B1 * | 12/2002 | Vaid et al. | 709/224 |
| 6,629,130 | B2 * | 9/2003 | Mertama et al. | 709/206 |
| 6,633,918 | B2 * | 10/2003 | Agarwal et al. | 709/231 |
| 6,731,600 | B1 * | 5/2004 | Patel et al. | 370/230 |
| 6,973,125 | B2 * | 12/2005 | An | 375/225 |
| 7,024,475 | B1 * | 4/2006 | Abaye et al. | 709/224 |
| 2001/0054115 | A1 * | 12/2001 | Ferguson et al. | 709/248 |
| 2002/0023270 | A1 * | 2/2002 | Thomas et al. | 725/95 |
| 2002/0091802 | A1 * | 7/2002 | Paul et al. | 709/220 |
| 2002/0167967 | A1 * | 11/2002 | Jammes et al. | 370/468 |
| 2003/0028606 | A1 * | 2/2003 | Koopmans et al. | 709/206 |
| 2003/0037160 | A1 * | 2/2003 | Wall et al. | 709/233 |
| 2004/0139208 | A1 * | 7/2004 | Tuli | 709/230 |
| 2004/0199635 | A1 * | 10/2004 | Ta et al. | 709/226 |

OTHER PUBLICATIONS

George Melissargos and Pearl Pu Conceptualizing bandwidth allocation in network management ACM Press 1999 pp. 62-69.*
S.S. Manvi and P. Venkataram Mobile Agent Based Online Bandwidth Allocation Scheme for Multimedia Communication Protocol Engineering and Technology (PET)-Unit, Electrical Communication Engineering Department, Indian Institute of Science, Bangalore-560012 India.*
Jeffrey Rubin RealPlayer Plus G2 means faster video Network Computing Sep. 1, 1998 vol. 9 Iss 16 p. 36-37.*
David Bandel Robert Napier Special Edition Using Linux, Sixth Edition Dec. 22, 2000 Screeprint.*
Configure Automatic Bandwidth Allocation Wayback Machine Archive Date May 20, 2003.*
Sandy Stevens What do NDS and DEN have in common? Besides the Letter D and N Jan. 1, 1999.*

* cited by examiner

*Primary Examiner*—Rachna S Desai
*Assistant Examiner*—Andrea N Long
(74) *Attorney, Agent, or Firm*—Merchant & Gould; Ryan T. Grace

(57) ABSTRACT

Systems and methods for providing tailored bandwidth profiles for a given operating environment are disclosed.

20 Claims, 13 Drawing Sheets

METHODS FOR TAILORING A BANDWIDTH PROFILE FOR AN OPERATING ENVIRONMENT

FIELD OF THE INVENTION

The present invention relates to systems and methods for providing tailored bandwidth profiles for a given operating environment.

BACKGROUND OF THE INVENTION

Over the past several years, there has been a significant increase in the various types of networks that are available to users. For example, home users, who were once restricted to slow dialup modems, have been able to transition to ISDN (Integrated Services Digital Network) technology, and then to broadband technologies like cable modem and DSL (Digital Subscriber Line). Corporate entities, who once were only able to offer access to their servers through a corporate LAN (Local Area Network), now are able to provide users access to their network through web-based applications and wireless networks like GPRS (General Packet Radio Service).

In addition to the increased variety of networks, there has been a significant increase in the number of existing networks, and thus network availability to users. For example, it is not uncommon for a coffee shop to offer wireless Internet connectivity to its visiting patrons. This combined with the proliferation of mobile computing devices has lead to a variety of operating environments available to a user. Each of the available operating environments has a set of characteristics, which vary from network to network. Characteristics such as bandwidth and latency vary significantly from one network to another. Further, a user's behavior also may vary depending on the operating environment available to the user.

Accordingly, there is a need in the art to provide system flexibility to users depending on the operating environment of the user.

SUMMARY OF THE INVENTION

The present invention addresses some of the difficulties and problems discussed above by the discovery of a method of providing to a user an option of selecting a bandwidth profile that takes into account the operating environment of the user. The user may select from a variety of available bandwidth profiles or create a customized bandwidth profile depending on a number of operating environment factors.

Accordingly, the present invention is directed to a method of providing a user with a bandwidth profile, wherein the method comprises (a) providing a number of bandwidth profiles, wherein at least one bandwidth profile is a low bandwidth profile; and (b) allowing the user an option to select one of the bandwidth profiles. The present invention is further directed to a method of operating a computer, wherein the method comprises (a) providing a number of different bandwidth profiles including at least one low bandwidth profile; and (b) selecting a first bandwidth profile depending on one or more characteristics of an operating system. In one exemplary embodiment of the present invention, the low bandwidth profile is suitable for use in an operating system having a bandwidth of greater than 0 kilobytes per second (Kbps) and less than about 128 Kbps. Other choices of bandwidth profiles may include (a) at least one off-line bandwidth profile for an operating system having a bandwidth of 0 Kbps; and (b) at least one high bandwidth profile for an operating system having a bandwidth of greater than or equal to about 128 Kbps.

The present invention is also directed to a tools option available to a user of a software application, wherein the tools option allows the user to select a bandwidth profile from a list of bandwidth profiles including at least one low bandwidth profile. The menu option may also allow a user to select a default mode, wherein a given application automatically selects a bandwidth profile depending on one or more characteristics of the operating system. In addition, the menu option may allow the user to create a customized bandwidth profile, which is configured using input from the user.

The present invention is also directed to a computer readable medium having stored thereon computer-executable instructions for performing a method of providing a number of different bandwidth profiles including at least one low bandwidth profile; and (b) selecting a first bandwidth profile depending on one or more characteristics of an operating system. In addition, the present invention is directed to a computing system containing at least one application module usable on the computing system, wherein the at least one application module comprises application code for performing the above-described method of providing a number of different bandwidth profiles including at least one low bandwidth profile.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to a method for (a) providing a number of different bandwidth profiles including at least one low bandwidth profile; and (b) selecting a first bandwidth profile depending on one or more characteristics of an operating system. The method may further comprise providing a menu option to a user of a software application, wherein the menu option allows the user choose a selected bandwidth profile or enable the automatic selection of a bandwidth profile given one or more characteristics of the operating environment. The present invention is also directed to a computer readable medium having stored thereon computer-executable instructions for performing the above-described method, and a computing system containing at least one application module usable on the computing system, wherein the at least one application module comprises application code for performing the above-described method.

An exemplary computer system and exemplary operating environment for practicing the present invention is described below.

Exemplary Operating Environment

Figure 1:
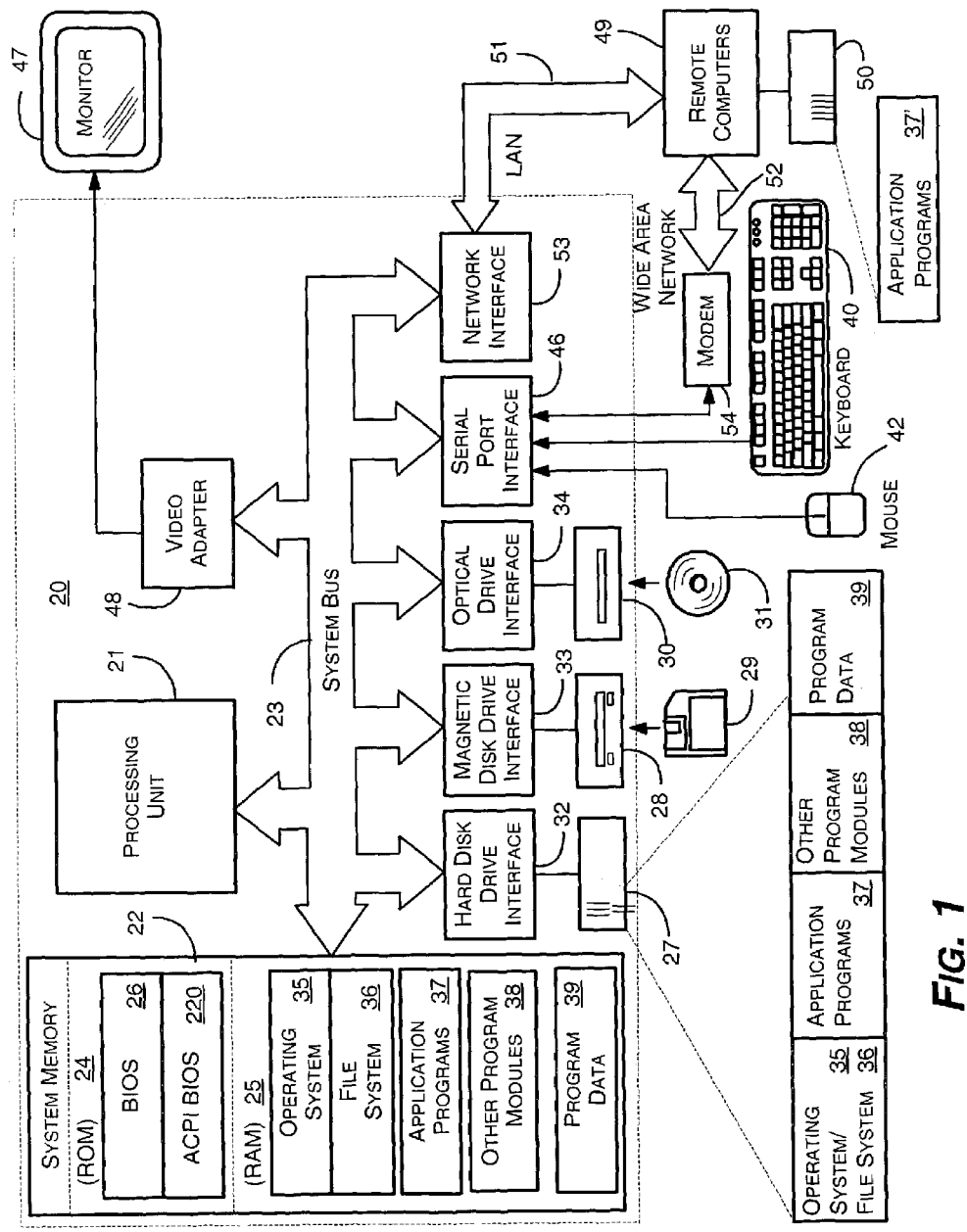
FIG. 1 is a flow diagram of some of the primary components of an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 (not shown) may be stored in the RAM 25 and/or hard drive 27 of the personal computer 20.

A number of program modules may be stored on hard disk 27, magnetic disk 29, optical disk 31, ROM 24, or RAM 25, including an operating system 35, an application program module 36, other program modules 37, and program data 38. Program modules include, but are not limited to, routines, sub-routines, programs, objects, components, data structures, etc., which perform particular tasks or implement particular abstract data types. Aspects of the present invention may be implemented as an integral part of an application program module 36 or as a part of another program module 37.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A monitor 47 or other type of display device may also be connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to personal computer 20, only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local area network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The present invention may also be practiced in distributed computing environments, where tasks are performed by remote processing devices that are linked through a communications network. In a distributed computing environment, program modules may be located in both local and remote memory storage devices.

IMPLEMENTATION OF EXEMPLARY EMBODIMENTS OF THE PRESENT INVENTION

As described above, the present invention is directed to a method for providing a choice of bandwidth profiles to a user, wherein each bandwidth profile is tailored to a given operating environment. Exemplary embodiments of the present invention are described below.

It should be noted that the present invention is applicable to a variety of operating systems and applications within a given operating system. Although the exemplary embodiments described below are primarily directed to Microsoft Corporation's Outlook® application, the present invention is applicable to any other application that seeks to provide bandwidth profile options to a user for an enhanced user experience.

I. CREATING A BANDWIDTH PROFILE

The present invention provides a user with a choice of two or more bandwidth profiles, wherein at least one bandwidth profile is a low bandwidth profile. As used herein, the term "low bandwidth" is used to describe a bandwidth ranging from greater than 0 Kbps to less than about 128 Kbps. Each bandwidth profile is configured to provide an optimum user experience for a given operating environment. A number of factors may be considered when creating a given bandwidth profile. Two classes of factors are detailed below: (a) factors that control the amount of data sent and/or received, and (b) factors that control how data is sent and/or received.

A. Factors that Control the Amount of Data that is Sent and/or Received

One or more of the following parameters may be adjusted automatically or by a user to control the amount of data that is sent and/or received in an operating environment. Each of the following parameters may be adjusted for a given bandwidth profile of the present invention.

1. Use of Data Compression

One parameter that may be used to create a given bandwidth profile is data compression. Data may be compressed prior to being transmitted from a first location (e.g., a client) to a second location (e.g., a server), and then uncompressed once the data is received by the second location. The degree of data compression may be adjusted depending on the amount of bandwidth available for a given operating environment and a given bandwidth profile.

A high degree of data compression is not always desirable given the costs associated with data compression. For example, data compression costs in terms of cpu and server cycles. The costs are directly proportional to the level of compression. Consequently, the desire to have a high degree of data compression is typically considered with an understanding of there are costs associated with data compression.

In an operating environment with a large amount of available bandwidth, typically greater than or equal to about 128 Kbps, a minimum amount of data compression is typically used to avoid data compression costs in terms of cpu and server cycles. Alternatively, in an operating environment with a limited amount of available bandwidth, typically less than about 128 Kbps, a higher degree of data compression may be used even though there are costs associated with such use.

In one exemplary embodiment of the present invention, ten degrees of data compression are available to a user ranging from no data compression ("0") to maximum data compression ("10"). As described below, the operating system may automatically choose one of the ten available degrees of data compression depending on one or more operating system characteristics. Alternatively, a user may manually choose one of the ten available degrees of data compression to create a customized bandwidth profile, which, in the mind of the user, best fits the user's present operating system.

2. Selective Synchronization of Files

Another parameter that may be used to create a given bandwidth profile is selective file synchronization. File synchronization may be performed on one or more files during start-up, shutdown, or periodically during running a given application. Files that may be synchronized include, but are not limited to, files associated with a given application, such as an inbox file, an outbox file, a calendar file, a task file, and a contacts file in Microsoft's Outlook® application.

One or more select files may be synchronized depending on the available bandwidth for a given operating environment. For example, in an operating environment having a large amount of bandwidth, all files may be synchronized periodically during the use of an application, and at any desired frequency of synchronization. Further, all of the files may be synchronized in any desired order of synchronization. In operating environments having a limited amount of bandwidth, a select number of files (i.e., first files) may be synchronized, while opting not to synchronize other files (i.e., second files) in the low bandwidth operating environment. Once a high bandwidth operating environment is available to the user, the first files and the second files may be synchronized at any desired frequency of synchronization as described above.

In one exemplary embodiment of the present invention, a low bandwidth profile may automatically synchronize one or more files of a given application, such as the inbox, calendar, tasks and contacts files of Microsoft's Outlook® application, during a file synchronization task (also referred to herein as a sync task). If a user navigates to another file (e.g., a second file) during the synchronization of a first file, the operating system in the low bandwidth mode may start an asynchronous sync task to retrieve the contents of the second file.

Desirably, in a low bandwidth profile, there is a maximum of two asynchronous sync tasks per user such that a first asynchronous sync task stops once the user navigates to a third file that qualifies for an asynchronous sync. A default sync mode may be implemented for asynchronous sync tasks such that the sync task analyzes the full item of a file or only a portion of the file, such as the message header if the file is a mail file.

3. Selective Synchronization of Parts of an Item

Data compression and selective file synchronization both contribute significantly to the ability to reduce the size of messages, and enable a more satisfactory user experience in an operating environment with a limited amount of bandwidth. However, in some cases, a desired degree of data compression and selective file synchronization does not provide a satisfactory user experience. In these cases, selective synchronization of select parts of an item may be utilized to further enhance the user experience in a limited bandwidth mode.

In one exemplary low bandwidth profile of the present invention, parts of a file are synchronized, such as the headers of messages within a mail file. In this embodiment, only mail headers will be retrieved and displayed to a user. Syncing mail headers only enables the following desirable system characteristics in a limited bandwidth environment: (1) since mail headers are relatively small, headers for all of the mail items in a mail folder may be quickly retrieved, avoiding the potential for unacceptable latency due to downloading unusually large items or a set of large items, and (2) since mail headers contain a given amount of information, a user is able to make decisions about which items he/she wants to fully download based on the header information.

4. Control Optional Data Transfers

Data transfers, other than sync-related data transfers described above, may be classified into a number of different categories depending on the necessity of the data transfer. In one exemplary embodiment of the present invention, data transfers are classified into the following categories:

(1) essential data transfers—data transfers that a user considers to be necessary to have a satisfactory user experience; and (2) "nice-to-have" data transfers—optional data transfers that are not essential, but enhance the user experience.

In an operating environment with a large amount of bandwidth, a bandwidth profile may be set up such that there is no limitation on the number or type of data transfers. However, when there is limited bandwidth available, the bandwidth profile may limit the number and/or type of data transfers. For example, a low bandwidth profile may allow essential data transfers, but limit or prevent altogether the "nice-to-have" data transfers.

One example of a "nice-to-have" data transfer is publishing of a user's schedule in a given application, such as Microsoft's Outlook® application. A mail or PIM application may be set up to publish a user's schedule to a remote server every 2 minutes. For a low bandwidth profile, the user's schedule may be published less frequently, such as every 60 minutes, or not published at all. However, for a high bandwidth profile, the user's schedule may be published at any time.

B. Factors that Control how Data is Sent and/or Received

One or more of the following parameters may be adjusted automatically or by a user to control how data is sent and/or received in an operating environment. Each of the following parameters may be adjusted for a given bandwidth profile of the present invention.

1. Adjust Buffer Size

Applications and servers transmit data back in forth between each other in fixed size packages known as and referred to herein as "buffers." For example, if a server wants to transmit a 64K item to a given application and the client and application use 32K buffers to transfer data, it would take two buffers to transmit the 64K item. Each buffer is transmitted in what is known as and referred to herein as "a roundtrip." An exemplary roundtrip may be described as a series of communications illustrated below:

Server: "Hey application, I'm going to send you a message"
Server: waits on application to respond
Application: "Ok go ahead."
Server: sends buffer to application
Application: ok, I got the data—thanks In operating environments having a limited amount of bandwidth, a large number of roundtrips is undesirable. A large number of roundtrips may result in increased latency due to the application and server wasting a lot of time waiting on responses from one another. In order to minimize the number of roundtrips in a limited bandwidth environment, the buffer size may be increased between the application and server. For example, in the illustrated example above, if the buffer size is increased to 64K, the number of roundtrips required to transmit the 64K item between the application and server is reduced from 2 to 1.

The desire to increase buffer size must be weighed against any potential shortcomings associated with large buffer sizes. For example, in operating environments where the connection between the application and server is unreliable, the transfer of an item may be interrupted at any time during the data transfer. If the transmission is terminally interrupted mid-buffer, the entire buffer must be resent when the transmission is resumed. Therefore, in situations where the connection is unreliable and the buffer size is increased, there is the potential for redundant transmissions of large amounts of data sent over the wire. Consequently, in some operating environments where the connection between the application and server is unreliable, it may be more desirable to have smaller buffer sizes to minimize the amount of data that is redundantly sent over the wire in the event of an interrupted transfer.

2. Perform Periodic Checks During Data Transfers

Another parameter that may be adjusted for a given bandwidth profile is the frequency of periodic checks during large data transfers. As discussed above, some operating environments have unreliable connections leading to interrupted data transfers. In the past, if a given application was synchronizing 100 items from a server and lost connection to the server on item 50, the application would re-sync the first 50 items once a connection is restored. Then, the application would resume the transfer of the remaining 50 items. In the present invention, periodic checks, such as periodic saves, may be made during data transfer so that once a transmission resumes, an application can start receiving data from the last point at which it saved. For example, in the 100 item data transfer given above, if a periodic save takes place after transferring item 45, the transfer of 100 items resumes at item 46 once the connection to the server is restored.

The frequency of periodic checks/saves may be adjusted as desired. In operating environments having a large amount of bandwidth and less potential for interrupted connections, the frequency of periodic checks/saves may be lower. In operating environments having a limited amount of bandwidth and a higher potential for interrupted connections, the frequency of periodic checks/saves may be greater.

II. EXEMPLARY STEPS IN SELECTING A BANDWIDTH PROFILE

The present invention provides a bandwidth profile menu item, which enables users to choose a given bandwidth profile depending upon the user's operating environment. As described below, in some embodiments of the present invention, the user may elect to have a given application automatically choose a bandwidth profile based on one or more characteristics of the operating system. In other embodiments of the present invention, a user may select a "canned" bandwidth profile provided by a given application using an operating system. In still other embodiments of the present invention, a company or agency administrator may dictate whether or not users have the ability to select a given bandwidth profile and/or create customized bandwidth profiles.

As used herein, the term "canned bandwidth profile" is used to describe bandwidth profiles that are configured for a given application, such as Microsoft's Outlook® application, and made available to a user. The features of canned bandwidth profiles cannot be modified by a user. Examples of "canned bandwidth profiles" include, but are not limited to, (a) the "Online" high bandwidth profile, (b) the "Online (Low Bandwidth)" low bandwidth profile, and (c) the "Offline" zero bandwidth profile described below with reference to FIGS. 2-3.

Figure 2:
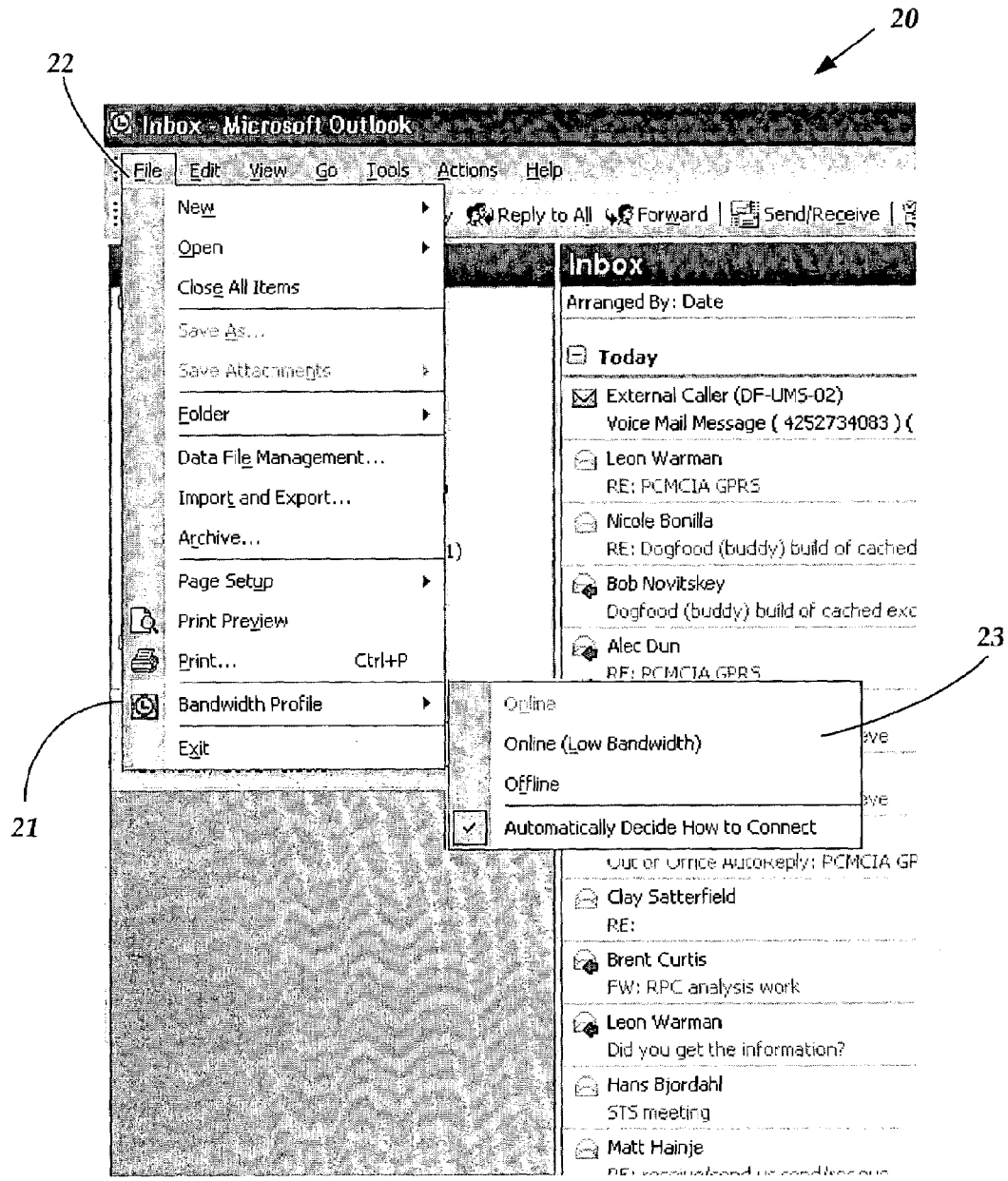
FIG. 2 depicts an exemplary file menu that provides a bandwidth profile menu option to a user for selecting a bandwidth profile from a list of possible bandwidth profile options.

In embodiments of the present invention wherein a user is given an option to select a given bandwidth profile, the user is provided with a mechanism for selecting a given bandwidth profile. One such exemplary mechanism is shown in FIG. 2. FIG. 2 depicts an exemplary bandwidth profile option box for providing the bandwidth profile feature to the user. As shown in FIG. 2, bandwidth profile option box 20 contains menu item 21 entitled "bandwidth profile" under the file option 22. If a user or administrator wants to select the "bandwidth profile" feature of the present invention, the user or administrator simply clicks on menu item 21, which opens options box 23. Within options box 23, the following options are available to a user: a high bandwidth profile entitled "Online," a low bandwidth profile entitled "Online (Low Bandwidth)," a no bandwidth profile entitled "Offline," and an option to enable the application to automatically determine the appropriate bandwidth profile for a given operating environment entitled "Automatically Decide How to Connect."

As shown in FIG. 2, only one of the four options available within option box 23 is selected at a given time. If a user decides to change a selected option to a different option, the user simply checks a box next to the available option or clicks on the available option.

Figure 3:
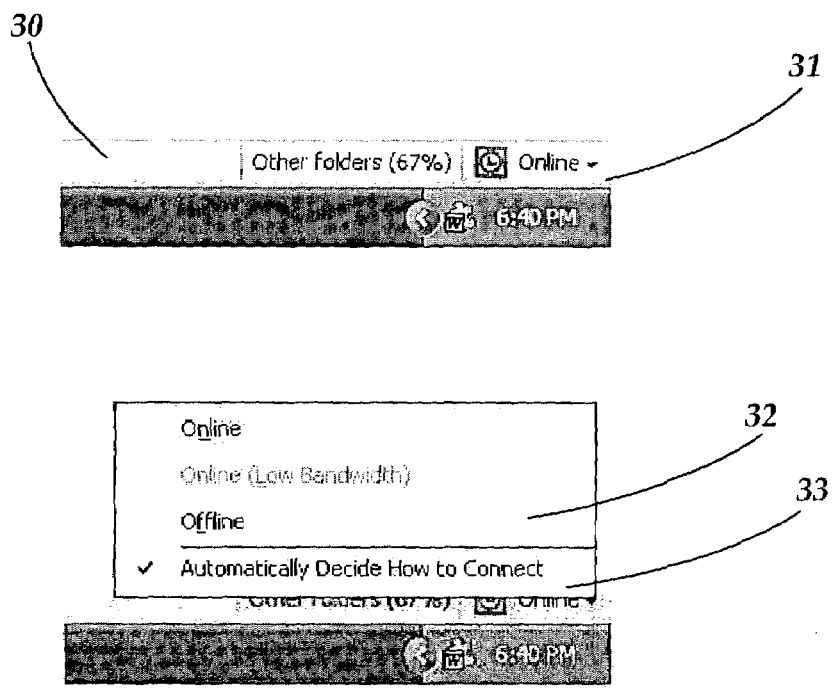
FIG. 3 depicts an exemplary status bar lever that provides a user with (a) a current bandwidth profile mode, and (b) a method for selecting a bandwidth profile from a list of possible bandwidth profile options.

The present invention also provides a new "lever" to the status bar of a given application in order to indicate to the user the current bandwidth profile option in use, as well as, allow the user to manually select a given bandwidth profile option from the new lever. Such a lever is shown in FIG. 3. As shown in FIG. 3, status bar 30 provides the current bandwidth profile mode to the user. In this embodiment, status bar 30 indicates to a user that the current bandwidth profile mode in use is the high bandwidth profile mode entitled "Online" as shown in box 31. By clicking on box 31, option box 32 is made available to the user for manual selection of an alternative bandwidth profile mode. As shown in FIG. 3, the currently selected bandwidth profile option is the "Automatically Decide How to Connect" option 33. In this example, the application has automatically chosen the high bandwidth profile mode entitled "Online." It should be noted that the available options within option box 32 of FIG. 3 are identical to the options available in option box 23 of FIG. 2.

The present invention is further directed to a menu option available to a user of a software application, such as the exemplary menu option shown in FIGS. 2-3, wherein the menu option allows the user to select a bandwidth profile from a list of available bandwidth profiles including at least one low bandwidth profile. The menu option may be accessible to a user via a file option page as shown in FIG. 2, and/or a status bar lever as shown in FIG. 3.

Figure 4A:
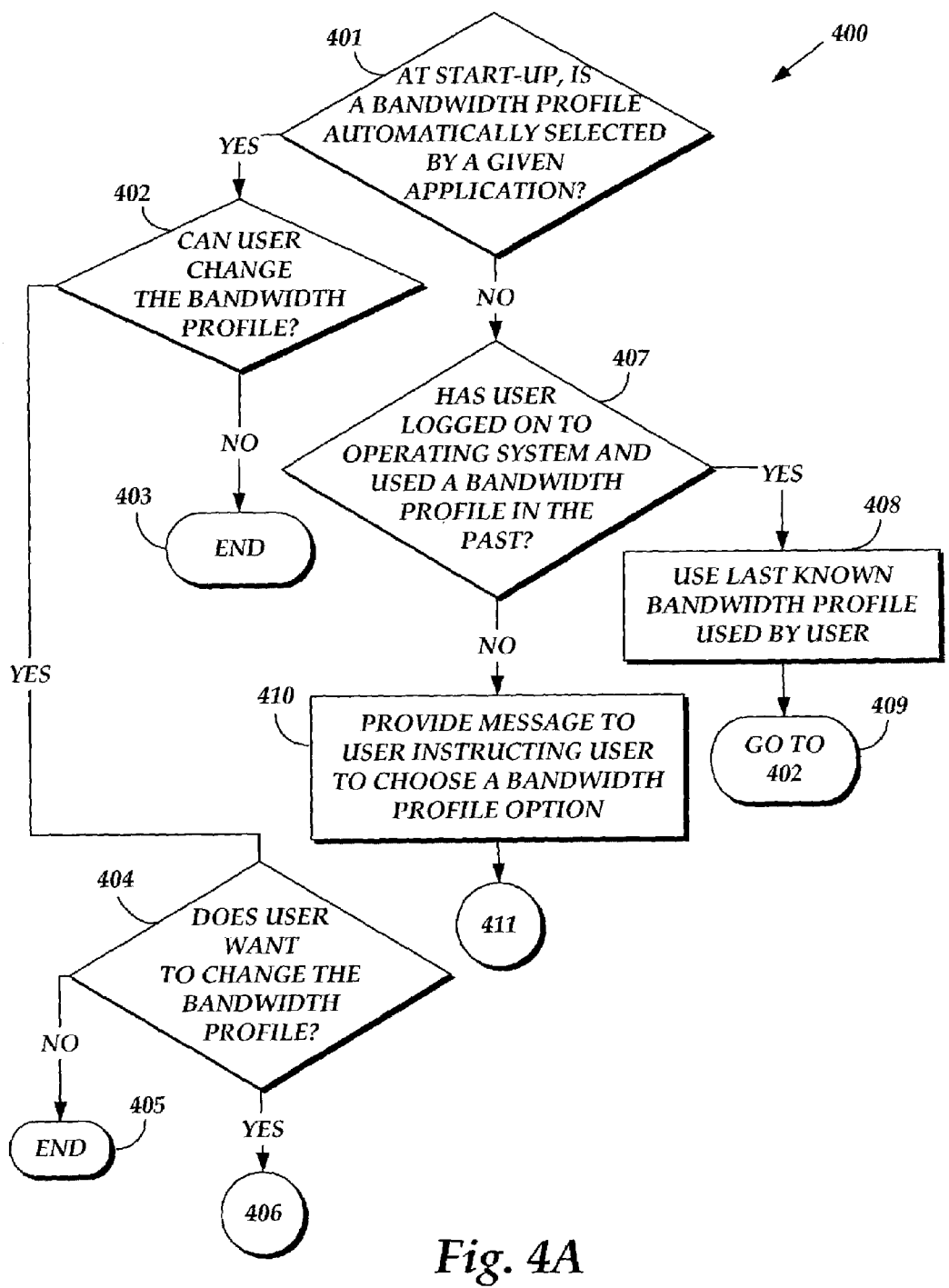
FIGS. 4A-4B depict a flow diagram showing exemplary steps for selecting a bandwidth profile from a list of possible bandwidth profile options.
Figure 4B:
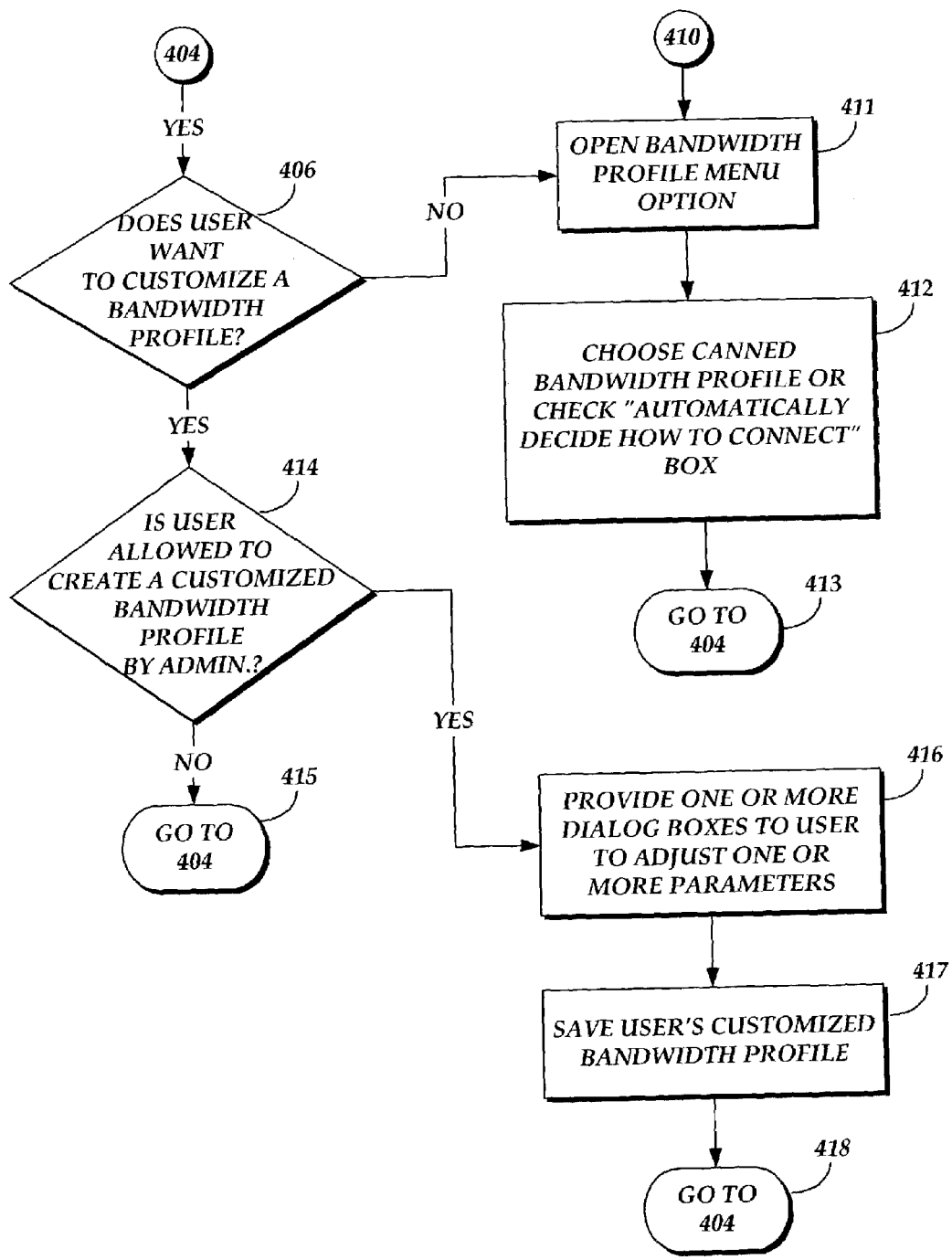

FIGS. 4A-4B provide a flow diagram showing exemplary steps available to a user for selecting a given bandwidth profile option. As shown in FIG. 4A, flow process 400 begins at decision block 401. In decision block 401, a determination is made as to whether a bandwidth profile is automatically selected by a given application. If a given application automatically selects a bandwidth profile at startup, flow process 400 proceeds to decision block 402. At decision block 402, a determination is made as to whether the bandwidth profile feature can be changed by a user. As discussed above, in some embodiments of the present invention, a company or agency may have a policy prohibiting users from modifying a default or automatically selected bandwidth profile. If such a policy exists, flow process 400 proceeds from decision block 402 to end block 403. If a user can change the bandwidth profile, the process proceeds to decision block 404.

At decision block 404, a determination is made as to whether a user wants to change the bandwidth profile. If a user does not want to change the selected bandwidth profile, flow process 400 proceeds to end block 405. If a user wants to change the bandwidth profile at decision block 404, flow process 400 proceeds to decision block 406 (shown in FIG. 4B). At decision block 406, a determination is made as to whether a user wants to customize a bandwidth profile. If a user wants to customize a bandwidth profile, flow process 400 proceeds from decision block 406 to decision block 414. If a user does not want to customize a bandwidth profile, flow process 400 proceeds from decision block 406 to step 411.

Returning to decision block 401 of FIG. 4A, if a determination is made that a given application does not automatically select a bandwidth profile, flow process 400 proceeds to decision block 407. At decision block 407, a determination is made as to whether the user has ever logged onto the operating system and used an available bandwidth profile during the prior log-in. If a determination is made that the user has logged onto the operating system and used an available bandwidth profile during the prior log-in, flow process 400 proceeds from decision block 407 to step 408. At step 408, the given application uses the last known bandwidth profile used by the particular user. From step 408, flow process 400 proceeds to step 409, which returns flow process 400 to decision block 402 and proceeds as described above.

If a determination is made at decision block 407 that a given user has not logged onto the operating system in the past using an available bandwidth profile, flow process 400 proceeds to step 410, wherein a message is provided to the user instructing the user to choose a bandwidth profile option. From step 410, flow process 400 proceeds to step 411, wherein the user opens a bandwidth profile menu option. From step 411, flow process 400 proceeds to step 412, wherein a user chooses a canned bandwidth profile or checks the "Automatically Decide How to Connect" option box. From step 412, flow process 400 proceeds to step 413, which returns flow process 400 to decision block 404 to proceeds as described above.

Returning to decision block 414, at decision block 414 a determination is made as to whether a user is allowed to create a customized bandwidth profile. As discussed above, in some embodiments of the present invention, a firm administrator may have a policy prohibiting users from creating customized bandwidth profiles. If such a policy exists, flow process 400 proceeds to step 415, which returns flow process 400 to decision block 404 to proceed as described above. If a user is allowed to create a customized bandwidth profile, flow process 400 proceeds from decision block 414 to step 416. At step 416, a user is provided with one or more dialog boxes so that the user may adjust one or more parameters to create a customized bandwidth profile. From step 416, flow process 400 proceeds to step 417, wherein the user's customized bandwidth profile is saved and associated with the user's log in identification. From step 417, flow process 400 proceeds to step 418, which returns flow process 400 to decision block 404 to proceed as described above.

It should be noted that in some cases a new user may log-on to an operating system and choose a bandwidth profile option that is not available at the time of log-in. For example, a user may choose a high bandwidth option even though the operating system is in a low bandwidth mode. In this case, the application will automatically choose by default an available low bandwidth profile.

III. PROVIDING CANNED BANDWIDTH PROFILES

As described above, the present invention provides a user with a choice of two or more "canned" bandwidth profiles, which are configured to provide an optimum user experience depending on the user's operating environment. The following classes of canned bandwidth profiles are provided to a user in the present invention.

A. Low Bandwidth Profiles

The present invention provides at least one low bandwidth profile for users having access to operating systems having a bandwidth of greater than 0 Kbps to less than about 128 Kbps. The low bandwidth profile may comprise one or more of the characteristics described below.

1. Data Compression

The low bandwidth profile of the present invention will desirably use data compression and decompression in order to fully utilize a user's limited bandwidth. In one exemplary embodiment of the present invention, data compression and decompression may be utilized in an application-server relationship, wherein the application is Microsoft's Outlook® application. Data compression algorithms may be used to compress HTML messages to a more compact size. Desirably, the compression algorithm used will compress the headers, body, attachments, and any other portion of the HTML message to achieve a reduction in size of HTML messages of up to about 85% of an original size.

2. Synchronization of Files

The low bandwidth profile of the present invention will also desirably automatically sync a minimum number of folders, while performing on-demand sync of other files as desired by a user. For example, the low bandwidth profile may be configured to automatically synchronize an inbox file and a calendar file of Microsoft's Outlook® application, but only synchronize other files, such as the tasks file and the contacts file, when specifically instructed to do so by the user.

3. Selective Synchronization of Parts of a File

When possible, the low bandwidth profile of the present invention will also desirably comprise selective synchronization of parts of a file as opposed to the entire file. For example, when the file comprises a mail folder, such as in Microsoft's Outlook® application, the low bandwidth profile will desirably sync mail headers only during an initial sync. If a user chooses to read a message given the mail header of the message, the user may then choose to fully download the body of the message. Further details regarding viewing messages in a low bandwidth profile are given below.

a. Viewing a Header Message Via a Preview Pane

Figure 5:
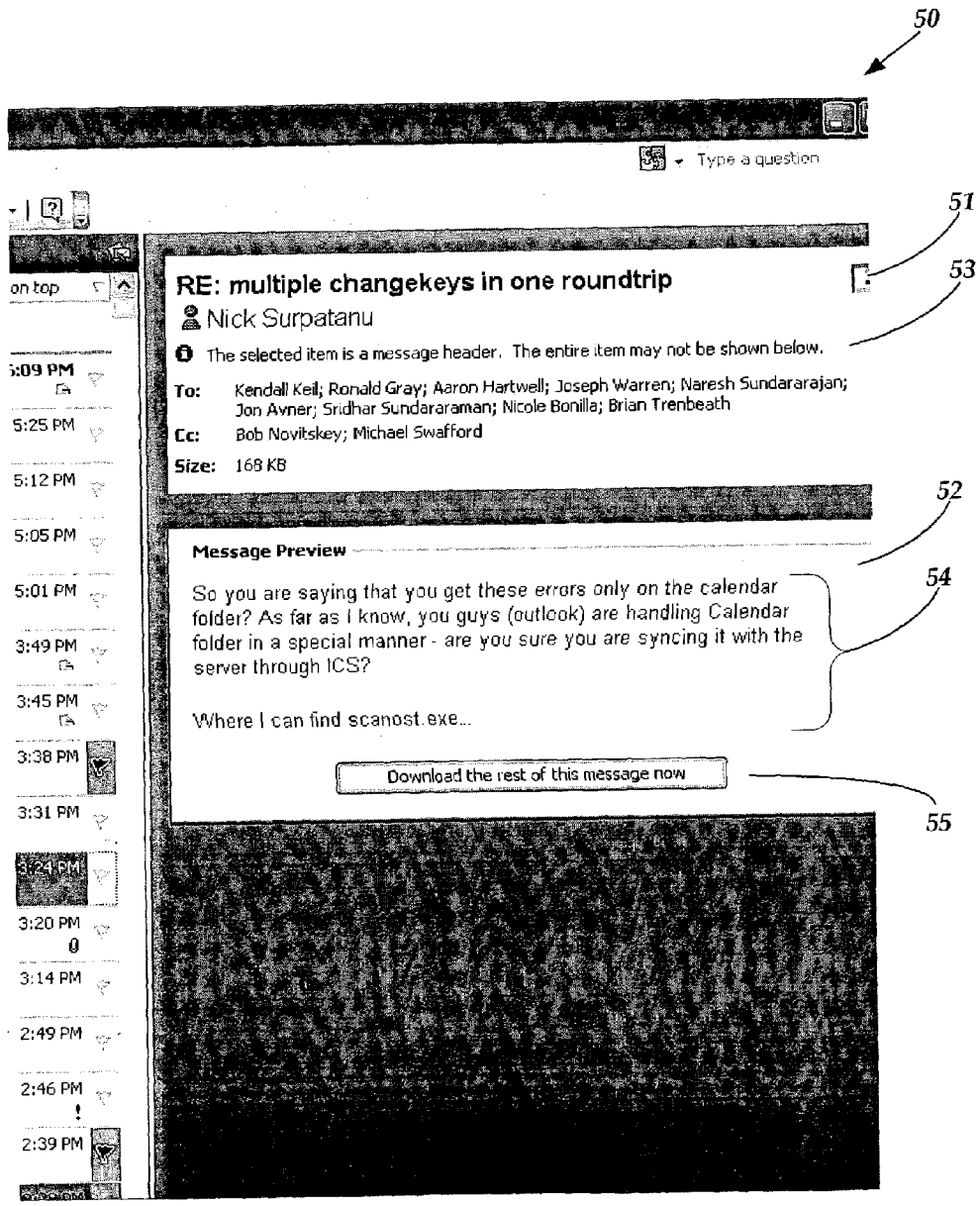
FIG. 5 depicts an exemplary screen shot of a message header, at least a portion of the message body in a preview pane, and a download option that provides a user with the option to download the remainder of the message body while using a low bandwidth profile.

One possible feature of a low bandwidth profile is the ability to view portions of a mail message in a preview pane such as the exemplary preview pane shown in FIG. 5. As shown in FIG. 5, screen shot 50 provides message header 51 and message preview pane 52. Within header 51 is an info bar 53, which provides a viewer with a highlighted message. In this exemplary embodiment, info bar 53 states that "The selected item is a message header. The entire item may not be shown below." Message preview pane 52 contains at least a portion of a message body 54, as well as, button 55, which may be used to download a remaining portion of the message not shown in message body 54. In this exemplary embodiment, button 55 states "Download the rest of this message now."

Clicking on the "Download the rest of this message now" button 55 as shown in FIG. 5 initiates an asynchronous sync of the message shown in header 51 and message preview pane 52. Typically, during a downloading step, other controls available to a user are disabled in a low bandwidth mode.

Figure 6:
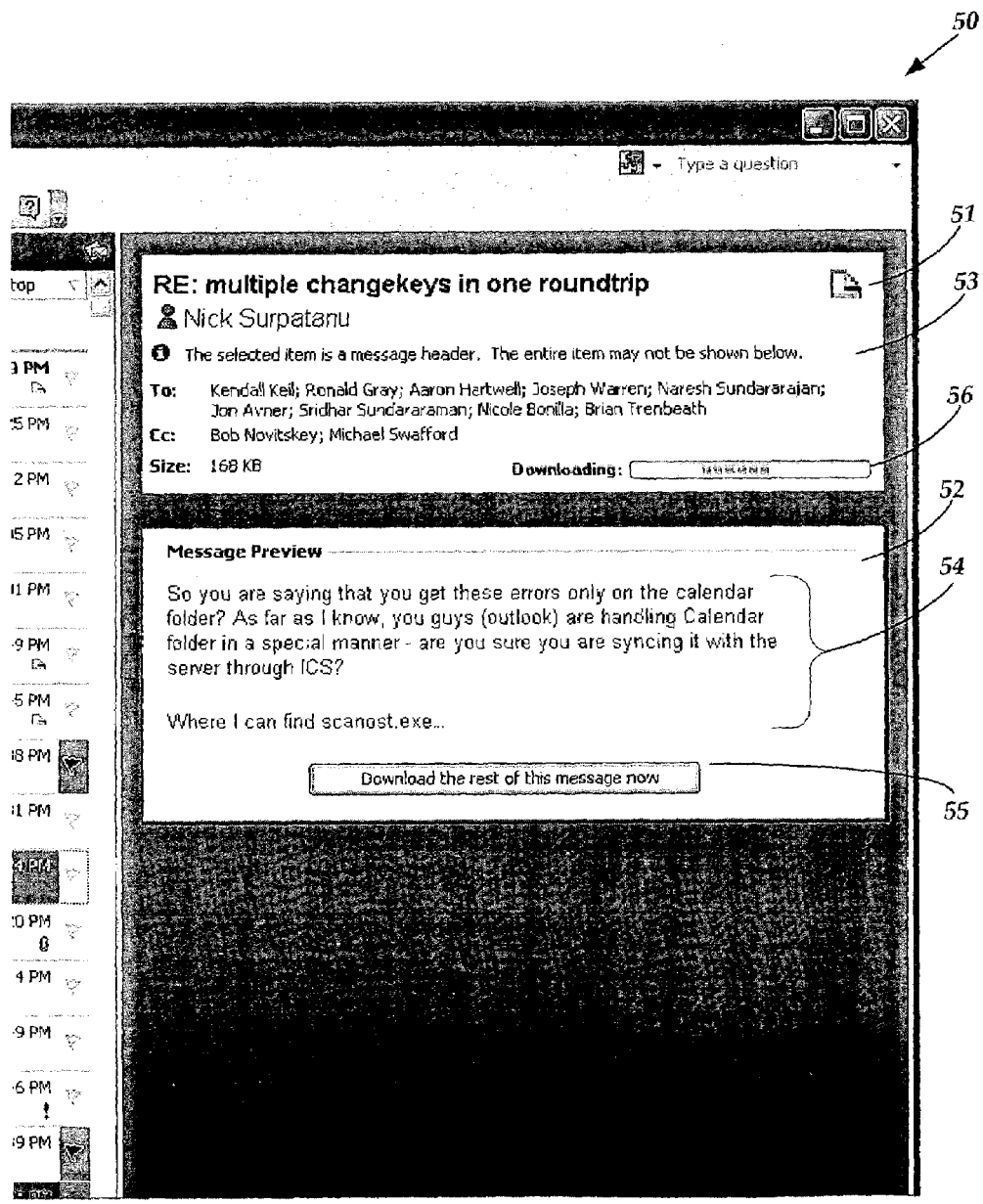
FIG. 6 depicts the exemplary screen shot of FIG. 5 during a message body downloading step.

The user's view will change to show that a download process is occurring. An exemplary view is shown in FIG. 6. As shown in FIG. 6, downloading icon 56 appears within header 51 while the message is being downloaded. Once the message has been downloaded, downloading icon 56 disappears and preview pane 52 displays the full message.

b. Opening a Header Message in Low Bandwidth Mode

Figure 7:
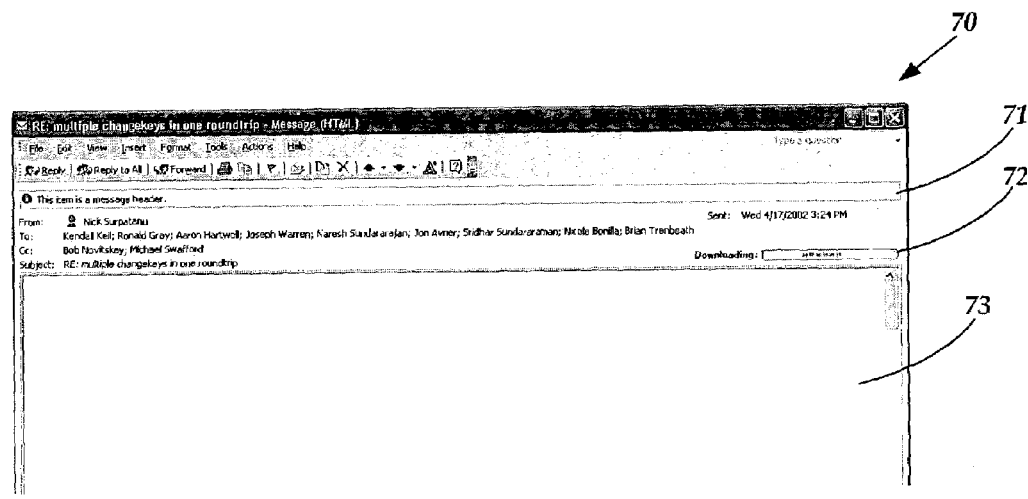
FIG. 7 depicts an exemplary screen shot of a message header, an empty preview pane, and a downloading indicator that indicates that a user is opening a message while using a low bandwidth profile.

If a user takes some action on a header that would normally cause the item to be opened, the application (e.g., Microsoft's Outlook® application) will automatically fetch the remainder of the item. While the item is being downloaded, the application will present the user with a view that contains the header information, but does not contain a three line preview of the message. Such a view is shown in FIG. 7. As shown in FIG. 7, screen shot 70 includes an info bar 71, which provides a message to the viewer that the item displayed is a message header. In this exemplary embodiment, info bar 71 displays the message "This item is a message header." Screen shot 70 also provides the user with a downloading icon 72, which indicates to the user that the message is being downloaded for full view. As discussed above, prior to downloading the message, the preview pane 73 is empty. Once the message has been downloaded, info bar 71 will contain information that is relative to the complete message and the downloading icon 72 will disappear. Further, the message body will be displayed in preview pane 73, and any attachments will be accessible to the user as described below.

c. Marking/Unmarking and Processing Marked Headers

In a low bandwidth mode, a user may choose to mark one or more headers for download instead of opening the header message as described above. The user may select one or more headers from their mail view, right click on the header, and then select a menu item for marking messages for download. One exemplary screen shot for providing users the ability to mark one or more headers is shown in FIG. 8.

Figure 8:
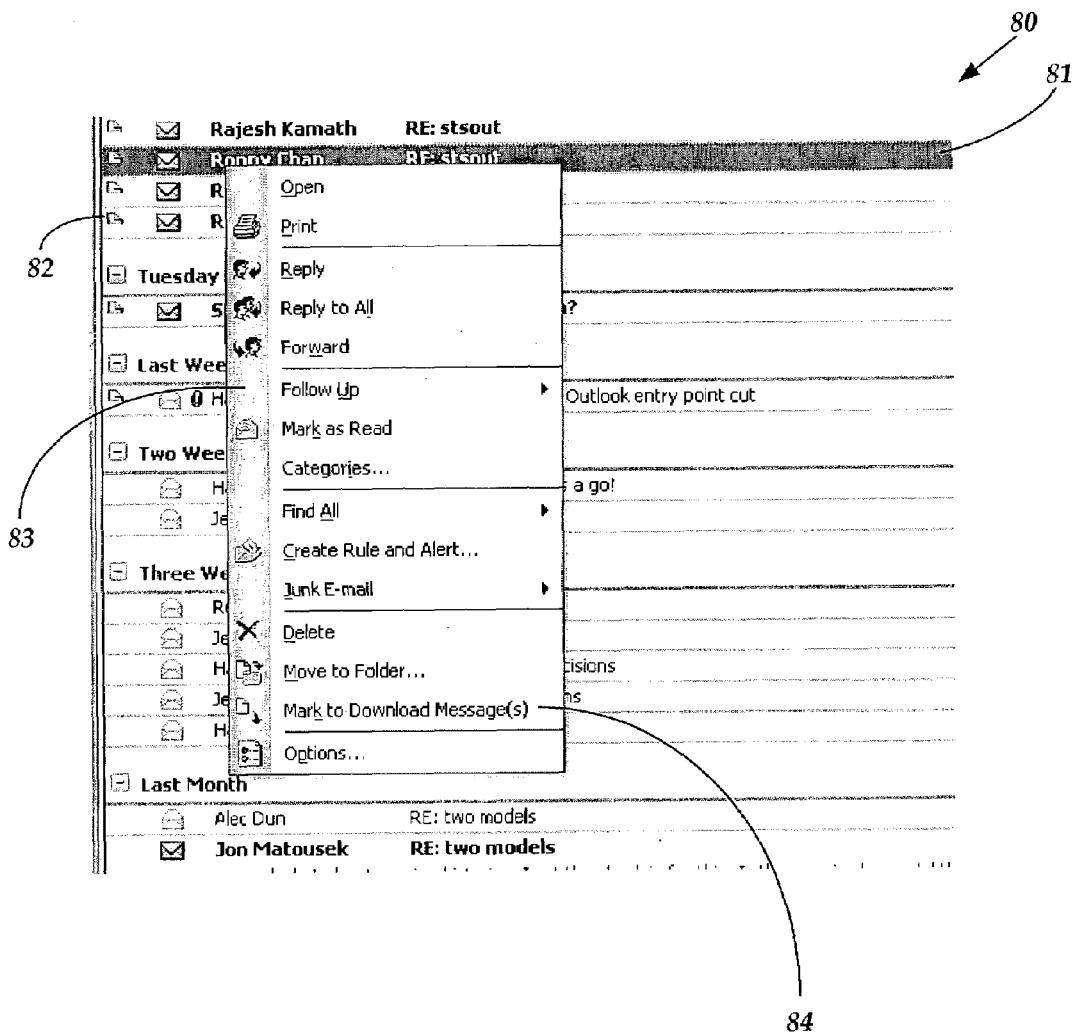
FIG. 8 depicts an exemplary screen shot of a mail view, a selected message header, and a context menu for marking one or more selected message headers while using a low bandwidth profile.

As shown in FIG. 8, screen shot 80 depicts selected header 81 within mail view 82. By right clicking on select header 81, context menu 83 appears. Context menu 83 provides a number of options available to a user including the "Mark to Download Message(s)" option 84. By selecting option 84, a user marks select header 81 for future download. In addition to the appearance of context menu 83, one or more hot keys may be used to perform the options listed within context menu 83. For example, hot keys "Ctrl-Alt-M" and "Ctrl-Alt-U" may be used for marking and unmarking headers respectively. Further, such hot keys may be placed within context menu 83 adjacent to the respective options listed. If a user has more than one header selected, the above-described hot keys may be used to mark or unmark all of the selected headers.

d. Processing Marked Headers

Figure 9:
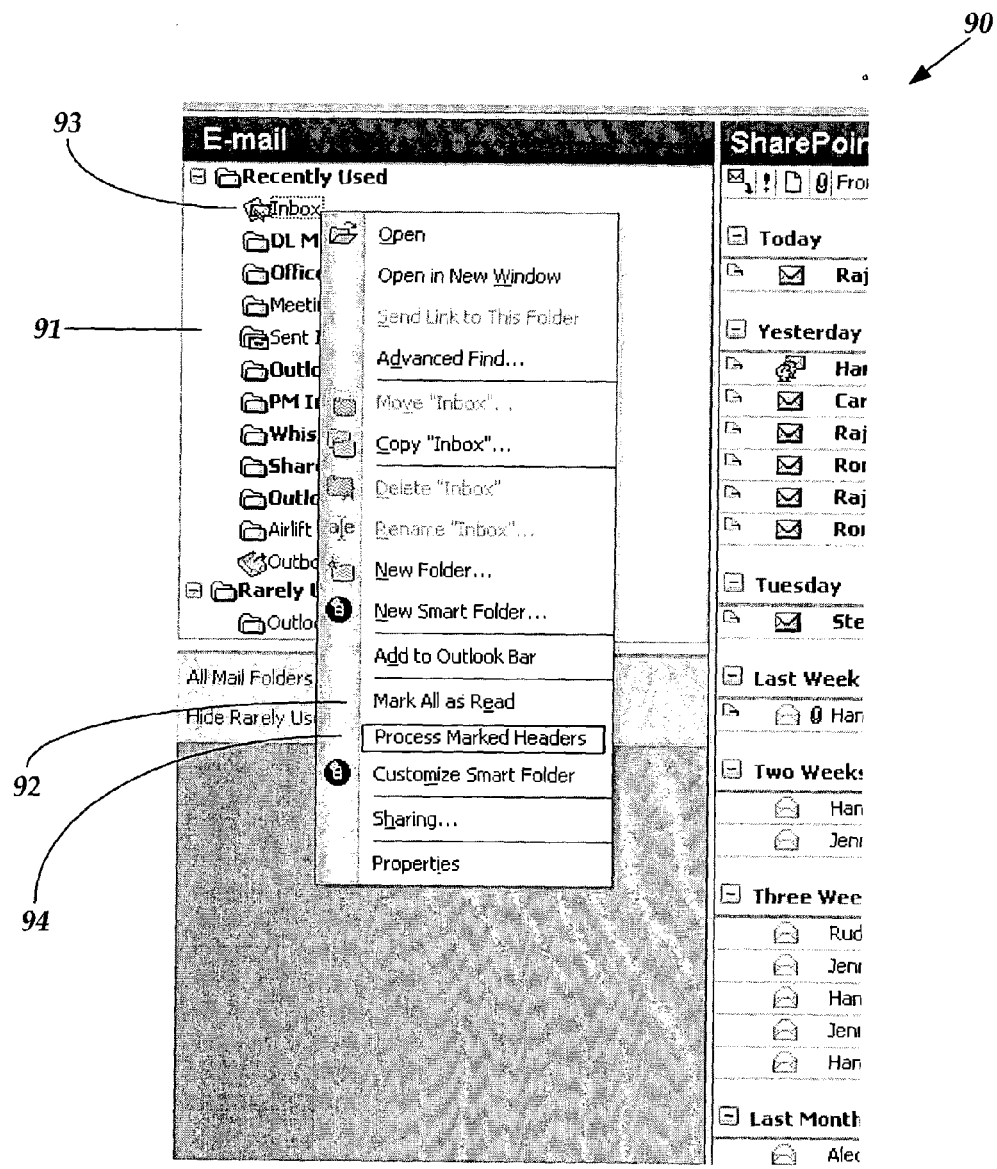
FIG. 9 depicts an exemplary screen shot of a folder bar, a selected inbox folder, and a context menu containing an option for processing one or more marked message headers while using a low bandwidth profile.

In the low bandwidth mode, marked headers may be processed in a number of ways. One exemplary method of processing marked headers is depicted in FIG. 9. As shown in FIG. 9, screen shot 90 depicts a folder bar 91, which contains a list of recently used folders. By right clicking on a folder within folder bar 91, context menu 92 appears. In the exemplary embodiment shown in FIG. 9, a user has right clicked on inbox folder 93. Within context menu 92, a number of options are available to a user. By clicking on "Process Marked Headers" option 94, a process of retrieving the full items for each marked header for download is initiated.

The "Process Marked Headers" option 94 may be available for any of the folders listed in folder bar 91 that can contain header items.

e. Special Headers

The low bandwidth profile of the present invention provides a similar method of viewing headers in a preview pane for the following types of items: meeting requests, read receipts, delivery receipts, blob signed message, and encrypted messages. For these types of items, a user will be given the option to view a portion of the message in a preview pane, and have the option to download the remainder of the message, if any, by clicking on a "Download the rest of this message now." button presented in the preview pane. Alternatively, a user may take some action to open the message while in a low bandwidth mode. As discussed above, during a downloading step, other controls are disabled. In addition, a user may mark and/or unmark any of the above-described special headers using the marking/unmarking procedure as described above.

f. Automatic Backfill of Header Items

Once a user moves from a low bandwidth mode to a high bandwidth mode, a process of backfilling header items may be automatically initiated by a given application. If the default sync mode for the high bandwidth profile syncs full items, all of the header items will automatically convert to full items. If the default sync mode of the high bandwidth profile is for marked headers only, marked headers will be automatically converted to full items.

4. Control Optional Data Transfers

As discussed above, in the low bandwidth profile of the present invention, the number and/or types of data transfers that take place may be limited or prevented altogether in order to efficiently use the available bandwidth. Further, when a type of data transfer is desired in a low bandwidth mode, the frequency of the data transfer may be adjusted such that the data transfer takes place less frequently than the frequency used in a high bandwidth mode.

The low bandwidth profiles of the present invention may further include one or more of the following features in order to effectively control the amount and type of data transfers in a limited bandwidth mode.

a. Free/Busy Retrieval and Publication

In a given application such as Microsoft's Outlook® application, free/busy retrieval and publication may be limited to avoid unnecessary data transfers. In one embodiment of the present invention, a low bandwidth profile removes the "retrieve free busy" button as an option to a user. The user may manually retrieve the free/busy option by using the scheduling tab.

Microsoft's Outlook® application stores two types of free/busy information for a user: (1) private free/busy, and (2) local free/busy. Public free/busy information is stored as a message and is periodically pushed to a hidden public folder. The amount of information and the frequency of publication may be to some degree controlled by the user. In the low bandwidth profile of the present invention, the public free/busy information is desirably published in increments of two months, and is desirably updated every fifteen minutes if something in the user's calendar has changed. The public free/busy data is relatively compressed and small, typically averaging less than 1 kilobyte in size.

Private free/busy information is typically stored as an associated message in a user's calendar folder. This data is typically not compressed and tends to be larger than public free/busy information. In a high bandwidth profile, the private free/busy information may be replicated to the server every time a change is made to a user's calendar. However, in a low bandwidth profile, the private free/busy information is desirably not replicated to the server when changes are made to a user's calendar. Further, when the user's calendar folder is synced, the private free/busy information is desirably not synced.

b. Avoiding Public Folders

Since public folders are often times on different servers than a user's mail and PIM data, access of public folders typically requires a referral and a new log on. Such processes require an unacceptable amount of time (i.e., as much as fifteen seconds on a GPRS system) and require a large transfer of data (i.e., in some cases greater than fifteen kilobytes). In order to avoid public folders, one or more of the following steps may be taken.

i. Rely on Custom Forms Cache

In the low bandwidth profiles of the present invention, custom forms will typically not be retrieved from a public forms library usually located on a separate server, but instead will be retrieved from a local forms cache. If an item references a form that does not exist in the local forms cache, a fallback logic will be used to provide the next best match of the desired form. This process avoids public forms libraries and/or organizational forms libraries. Further, this process avoids downloading of forms from these public folders, which may save considerable cost since many forms are relatively large in size.

ii. Rely on the Off-Line Address Book (OAB)

Firm administrators may control the amount of information that is published in an off-line address book (OAB). When Microsoft's Outlook® application requests data from the OAB and finds that one or more of the fields that is being requested is empty, the Outlook® application automatically searches the GC in an attempt to retrieve the data. Since the OAB is used in a large number of operations, the GC is constantly being searched by the Outlook® application, which increases latency in the process.

In the present invention, the low bandwidth profile desirably relies only on the OAB for background operations such as name resolution, retrieving e-mail addresses for free/busy information, etc. In a low bandwidth mode, the GC will only be searched when a user is interacting directly with an address book and a field that is visible on the screen, but not present in the OAB.

iii. Avoid Automatic Downloads of the OAB Update

In a low bandwidth mode, the OAB will desirably not be automatically downloaded. Instead, the OAB will be automatically downloaded once a user switches to a high bandwidth mode. A user may have the option to download the OAB manually. The user may download the OAB manually by one of the following methods: (1) a manual or timed sync of a send/receive group; and (2) through a dialog that is accessible by the following sequence: "Tools/Send/Receive/Download Address Book" or by clicking on the address book settings button on a send/receive group.

5. Opening a Message with Filtered Attachments while in Low Bandwidth Mode

Figure 10:
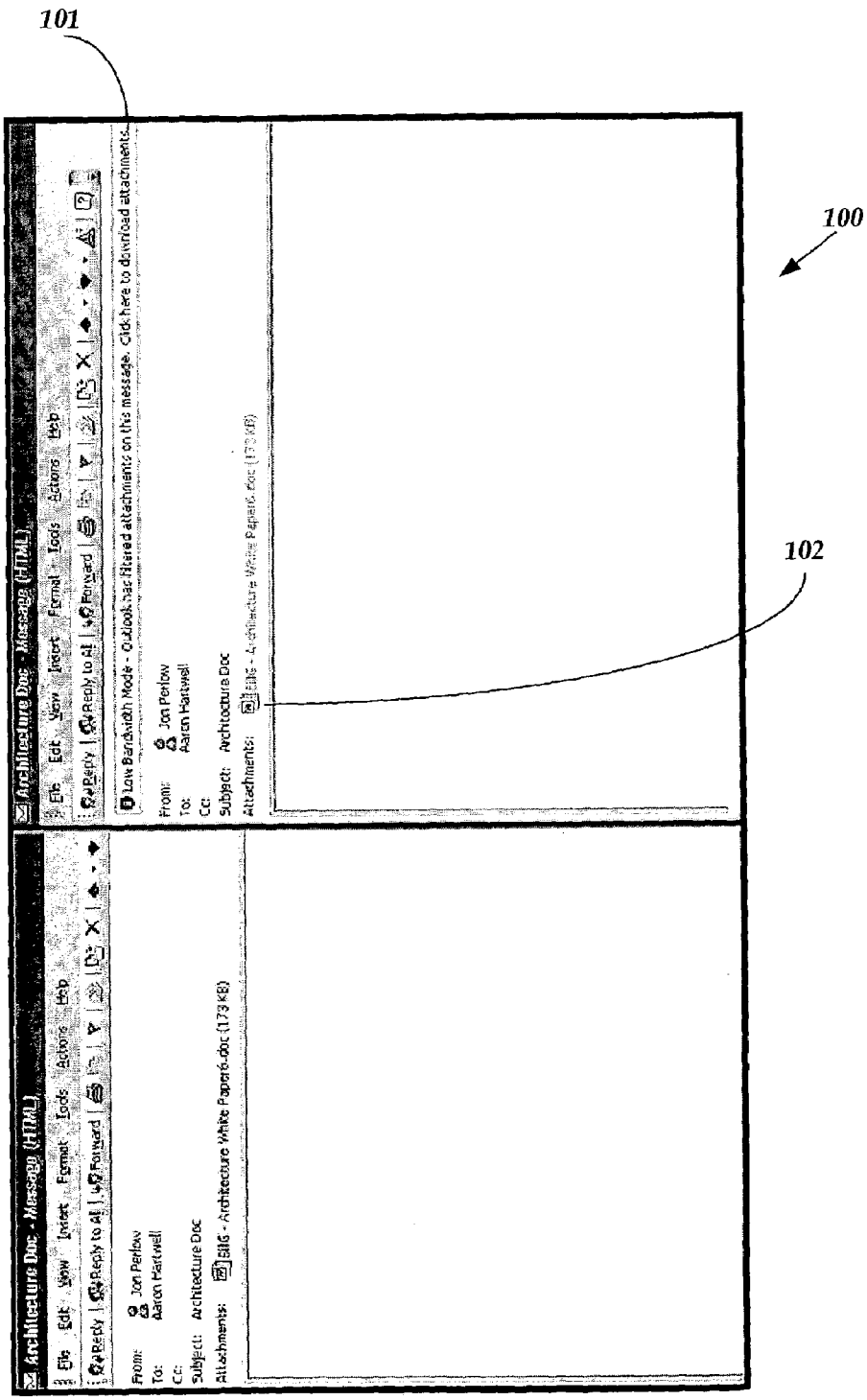
FIG. 10 depicts an exemplary screen shot indicating to a user in a low bandwidth mode that a given message contains filtered attachments.

As described above, a user may download select messages from a review of headers while in a low bandwidth mode. Any attachments associated with the downloaded message will appear as a ghost icon and text. An exemplary view of such a message is shown in FIG. 10. As shown in FIG. 10, screen shot 100 provides a message to a user in info bar 101 that states "Low Bandwidth Mode—Outlook has filtered attachments on this message. Click here to download attachments." Further, attachment 102 is shown as a ghosted icon and text. By clicking on info bar 101, attachment 102 is downloaded.

In a low bandwidth mode, a user may download attachments by opening the file menu and clicking on the "Download Attachments" option, which replaces the "Save Attachments" option available during a high bandwidth profile mode. Alternatively, a user may open the context menu as described above and click on the "Download Attachments" option, which replaces the "View Attachments" option available during a high bandwidth profile mode.

6. Send/Receive Group Settings

Figure 11:
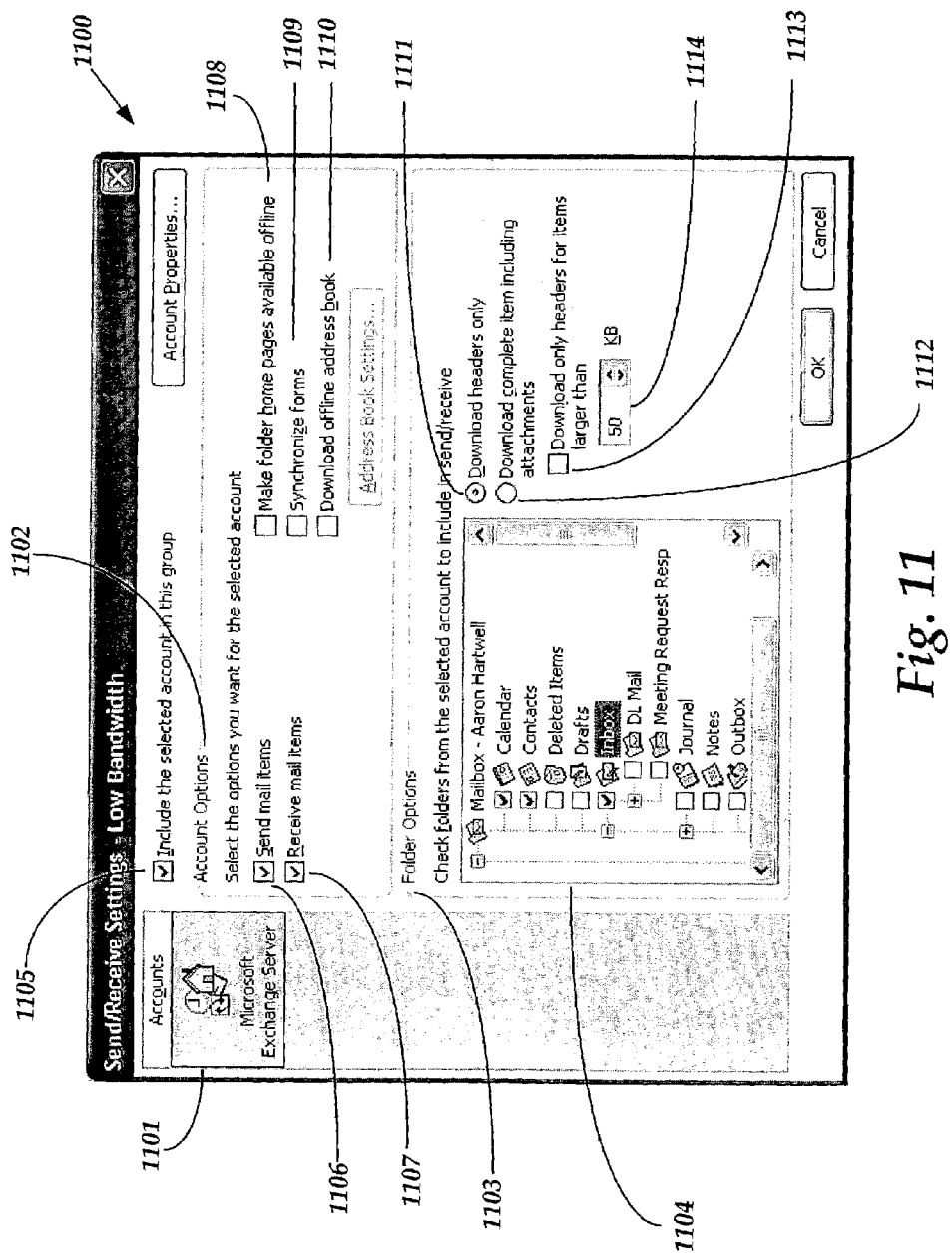
FIG. 11 depicts an exemplary screen shot of send/receive group settings for a group entitled "low bandwidth"

The low bandwidth profiles of the present invention may have one or more characteristics, which are defined by one or more special send/receive groups associated with a low bandwidth mode. A number of default settings may be associated with the "low bandwidth" send/receive group such as those shown in the exemplary screen shot of FIG. 11. As shown in FIG. 11, screen shot 1100 provides the following details to a user: accounts 1101, which displays the accounts associated with a given send/receive group; account options 1102; folder options 1103; and folder display 1104 within folder options 1103. As shown in FIG. 11, in the send/receive group entitled "Low Bandwidth" group, accounts 1101 includes only the exchange server account. Option 1105 entitled "Include the selected account in this group" is shown in a checked default mode. Account options 1102 contains a number of options available to a user including option 1106 entitled "Send mail items," and option 1107 entitled "Receive mail items." Other options within account options 1102 include an option 1108 entitled "Make folder home pages available offline," option 1109 entitled "Synchronize forms," and option 1110 entitled "Download offline address book." Desirably, in a low bandwidth profile, account options 1106 and 1107 are activated by default, while options 1108, 1109 and 1110 are not activated by default.

Folder options 1103 also provide a number of options available to a user. One or more folders within folder list 1104 may be checked by a user or automatically checked by default for a given application. As shown in FIG. 11, the low bandwidth profile desirably activates the following folders in a default mode: Calendar, Contacts and Inbox. Further, option 1111 entitled "Download headers only" allows headers of a message to be downloaded, while providing an option to a user to manually download the remainder of the message as described above. In the low bandwidth profile of the present invention, option 1111 is desirably activated by default. Option 1112 entitled "Download complete item including attachments" may be activated by default or by a user in a customized bandwidth profile as described below. If a user activates option 1112, the user may further choose to activate option 1113 entitled "Download only headers for items larger than," which enables the user to download entire items when the item is below a desired size. Option 1114 entitled "KB" allows a user to choose a threshold item size associated with option 1113.

Figure 12:
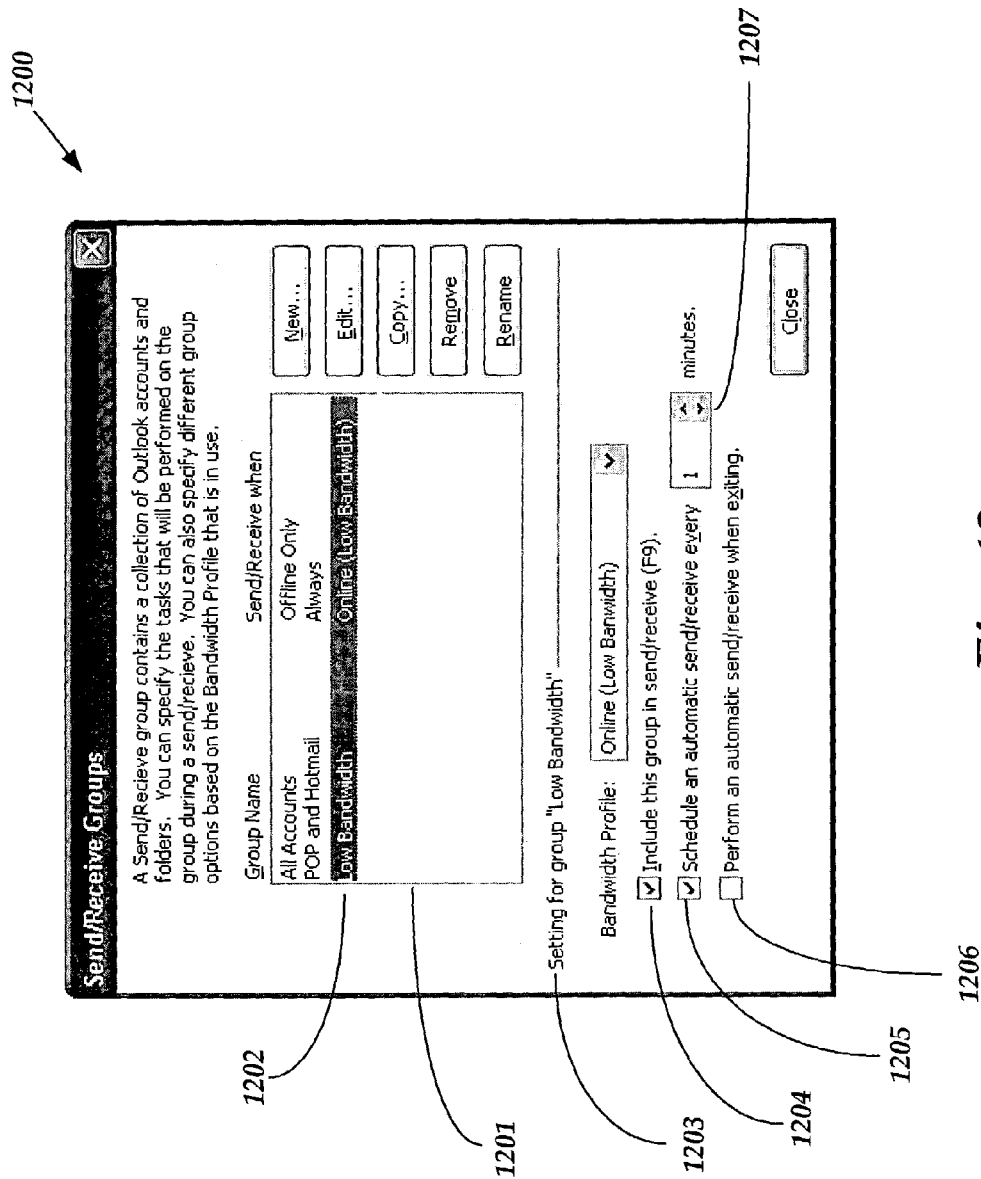
FIG. 12 depicts an exemplary screen shot provided to a user to display a list of available send/receive groups.

A number of send/receive groups may be created for a given bandwidth mode. The "Low Bandwidth" group settings as shown in FIG. 11 are desirable default settings, which may be established by a company administrator and/or IT department. A list of send/receive groups may be viewed in a send/receive group dialog such as the exemplary screen shot shown in FIG. 12. As shown in FIG. 12, screen shot 1200 provides a list of send/receive groups within area 1201 of screen shot 1200. Group 1202 entitled "Low Bandwidth" is highlighted within group list area 1201. A list of settings for highlighted "Low Bandwidth" group 1202 is provided in lower area 1203 of screen shot 1200 and is entitled "Setting for group "Low Bandwidth"." As shown in area 1203, a number of options are provided including option 1204 entitled "Include this group in send/receive (F9)," option 1205 entitled "Schedule an automatic send/receive every 1 minutes," and option 1206 entitled "Perform an automatic send/receive when exiting." The default settings for the exemplary low bandwidth send/receive group as shown in screen shot 1200 indicate that options 1204 and 1205 are activated, while option 1206 is not activated. Further, as shown in screen shot 1200, the frequency of an automatic send/receive may be adjusted by a user and/or administrator by adjusting option 1207.

A low bandwidth send/receive group may be automatically created when a user switches to a low bandwidth mode for the first time. The low bandwidth group will be visible in the send/receive group dialog box, such as the dialog box shown in FIG. 12, and will be automatically associated with a low bandwidth mode. If a user is authorized to create a customized bandwidth profile and creates one or more customized bandwidth profiles, each of the customized bandwidth profiles and the default low bandwidth profile will be displayed in the send/receive group dialog as described above.

B. High Bandwidth Profile

A high bandwidth profile is provided for users having access to operating systems having a bandwidth of greater than or equal to about 128 Kbps. The high bandwidth profile desirably has at least the following characteristics:

(1) data compression—a minimal amount of data compression;

(2) selective file synchronization—a minimal amount of selective file synchronization;

(3) selective synchronization of select parts of an item—a minimal amount of selective synchronization of select parts of an item;

(4) control over types of data transfer—a minimal amount of control over types of data transfer;

(5) buffer size—a minimal amount of control over buffer size; and (6) periodic checks/saves during data transfer—less frequent periodic checks/saves during data transfer.

As described above, when a user switches from a low bandwidth mode to a high bandwidth mode, one or more of the above-described limitations characterizing a low bandwidth profile are removed upon switching to a high bandwidth profile. The transition to a high bandwidth profile with its minimal restraints may automatically take place, such as when the application automatically detects characteristics of a high bandwidth mode, or manually take place, such as when a user manually chooses a high bandwidth profile as described above in FIGS. 4A-4B.

In addition, when a user switches from a high bandwidth mode to a low bandwidth mode, one or more of the above-described limitations characterizing a low bandwidth profile are initiated upon switching to a low bandwidth profile. The transition to a low bandwidth profile with its restraints may automatically take place, such as when the application automatically detects characteristics of a low bandwidth mode, or manually take place, such as when a user manually chooses a low bandwidth profile as described above in FIGS. 4A-4B.

C. Offline (No Bandwidth)

An offline bandwidth profile is provided for users that do not have a network connection or choose not to use an available network connection. When a user switches from a low bandwidth mode or a high bandwidth mode to an offline mode, the user looses the ability to transfer data and access information other than locally stored information. The transition to an offline bandwidth profile may automatically take place, such as when the application automatically detects characteristics of an offline mode, or manually take place, such as when a user manually chooses an offline profile as described above in FIGS. 4A-4B.

In addition, when a user switches from an offline mode to a low bandwidth mode or a high bandwidth mode, one or more of the above-described system features (i.e., data transfers, etc.) are initiated upon switching to a low bandwidth profile or a high bandwidth mode. The available system features will be determined depending on whether a low bandwidth profile or a high bandwidth profile is selected as described above. The transition to a low bandwidth profile or a high bandwidth profile may automatically take place, such as when the application automatically detects characteristics of either a low bandwidth mode or a high bandwidth mode, or manually take place, such as when a user manually chooses a low bandwidth profile or a high bandwidth profile as described above in FIGS. 4A-4B.

IV. CREATING A CUSTOMIZED BANDWIDTH PROFILE

In addition to canned bandwidth profiles, such as the exemplary canned bandwidth profiles described above, the present invention provides "customized bandwidth profiles." "Customized bandwidth profiles" may be created and modified by a user when made available by the application, operating system and/or administrator. The method of forming a customized bandwidth profile may comprise opening one or more dialog boxes and selecting one or more customized parameters for the bandwidth profile.

In one exemplary embodiment of the present invention, a user may create a customized bandwidth profile by creating and customizing a send/receive group using dialog boxes such as the exemplary dialog boxes shown in FIGS. 11-12. A user may customize a given bandwidth profile by selecting one or more options available to the user such as the options shown in FIGS. 11-12.

V. ADMINISTRATIVE CONTROL OVER BANDWIDTH PROFILES

As discussed above, a company administrator may be able to dictate company policy regarding the use of a given bandwidth profile, including a low bandwidth profile. Even when an administrator allows the use of low bandwidth profiles, the administrator may choose to limit alterations to default settings for a given low bandwidth profile, such as the settings shown in the exemplary screenshots of FIGS. 11-12. Administrators may control the default behavior of low bandwidth profiles by creating and configuring send/receive groups as described above. For example, the administrator may create and configure low bandwidth send/receive groups, which select certain folders to be automatically synchronized, the frequency of synchronization, the portions of an item to be synchronized (i.e., headers or full items), and whether or not custom forms are downloaded.

Further, an administrator may choose to control a given application's default behavior in a low bandwidth mode, such as Microsoft's Outlook® application, to make the application as user friendly as possible, while maintaining control over the bandwidth profile(s). The administrator may use certain settings in various tools options as described above. For example, the administrator may disable IM integration, automatic auto-archive, and other operations, which cause extraneous wire traffic that is undesirable in a low bandwidth network.

V. OTHER ASPECTS OF THE PRESENT INVENTION

The present invention is also directed to a computer readable medium having stored thereon computer-executable instructions for performing a method of providing a user with a bandwidth profile, wherein the method comprises (a) providing a number of bandwidth profiles, wherein at least one bandwidth profile is a low bandwidth profile; and (b) allowing the user an option to select one of the bandwidth profiles. The present invention is further directed to a computing system containing at least one application module usable on the computing system, wherein the at least one application module comprises application code for performing the above-described method of providing a user with a bandwidth profile.

The present invention is further directed to a computer readable medium having stored thereon computer-executable instructions for performing a method of operating a computer, wherein the method comprises (a) providing a number of different bandwidth profiles including at least one low bandwidth profile; and (b) selecting a first bandwidth profile depending on one or more characteristics of an operating system. In addition, the present invention is directed to a computing system containing at least one application module usable on the computing system, wherein the at least one application module comprises application code for performing the above-described method of operating a computer.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A computer-implemented method for communicating email application data according to communication parameters, the method comprising:

associating a plurality of predetermined canned bandwidth profiles with an email application, wherein the canned bandwidth profiles are not accessible to a user of the email application for modification;

determining characteristics of an operating system associated with the email application data;

based on the characteristics of the operating system, automatically determining first communication parameters for the email application according to a first predetermined canned bandwidth profile, wherein the first canned bandwidth profile is a low bandwidth profile that includes data compression, data decompression, selective part synchronization, reduced data transfer frequency, restricted attachment downloading, and selective transmission;

communicating the email application data according to the determined first communication parameters;

automatically determining changed characteristics of the operating system associated with the email application data;

based on the changed characteristics of the operating system, automatically determining second communication parameters for the email application according to a second predetermined canned bandwidth profile, wherein the second canned bandwidth profile is a high bandwidth profile that includes less data compression than the low canned bandwidth profile, less data decompression than the low canned bandwidth profile, a greater data transfer frequency than the low canned bandwidth profile, less restriction to attachment downloading than the low bandwidth profile, and less restrictions on transmission than the low bandwidth profile; and communicating the email application data according to the determined second communication parameters.

2. The computer-implemented method of claim 1, wherein the low bandwidth profile includes a selective file synchronization parameter, wherein the selective file synchronization parameter indicates files association with the email application data for synchronization.

3. The computer-implemented method of claim 1, wherein the selective part synchronization of the low bandwidth profile indicates a part of a file associated with the email application data for synchronization.

4. The computer-implemented method of claim 3, wherein the application is an email application and the selective part synchronization is association with a header of an email of the email application.

5. The computer-implemented method of claim 1, wherein the low bandwidth profile includes a buffer size parameter, wherein the buffer size parameter indicates a size of a communication buffer for communicating the email application data.

6. The computer-implemented method of claim 1, wherein the low bandwidth profile includes a check parameter, wherein the check parameter indicates a frequency of data checking during the communication of the email application data.

7. The computer-implemented method of claim 1, wherein the canned bandwidth profiles are accessible to an administrator of the email application for modification.

8. A computer-readable storage medium having computer executable instructions for communicating application data according to communication parameters, the instructions comprising:
   associating a plurality of predetermined canned bandwidth profiles with an application, wherein the canned bandwidth profiles are not accessible to a user of the application for modification;
   determining characteristics of an operating system associated with the application data;
   based on the characteristics of the operating system, automatically determining first communication parameters for the application according to a first predetermined canned bandwidth profile, wherein the first canned bandwidth profile is a low bandwidth profile that includes data compression, data decompression, selective part synchronization, reduced data transfer frequency, restricted attachment downloading, and selective transmission;
   communicating the application data according to the determined first communication parameters;
   automatically determining changed characteristics of the operating system associated with the application data;
   based on the changed characteristics of the operating system, automatically determining second communication parameters for the application according to a second predetermined canned bandwidth profile, wherein the second canned bandwidth profile is a high bandwidth profile that includes less data compression than the low canned bandwidth profile, less data decompression than the low canned bandwidth profile, a greater data transfer frequency than the low canned bandwidth profile, less restriction to attachment downloading than the low bandwidth profile, and less restrictions on transmission than the low bandwidth profile; and
   communicating the application data according to the determined second communication parameters.

9. The computer-readable storage medium of claim 8, wherein the low bandwidth profile includes a selective file synchronization parameter, wherein the selective file synchronization parameter indicates files association with the application data for synchronization.

10. The computer-readable storage medium of claim 8, wherein the selective part synchronization of the low bandwidth profile indicates a part of a file associated with the application data for synchronization.

11. The computer-readable storage medium of claim 10, wherein the application is an email application and the selective part synchronization is association with a header of an email of the email application.

12. The computer-readable storage medium of claim 8, wherein the low bandwidth profile includes a buffer size parameter, wherein the buffer size parameter indicates a size of a communication buffer for communicating the application data.

13. The computer-readable storage medium of claim 8, wherein the low bandwidth profile includes a check parameter, wherein the check parameter indicates a frequency of data checking during the communication of the application data.

14. The computer-readable storage medium of claim 8, wherein the canned bandwidth profiles are accessible to an administrator of the application for modification.

15. A system for communicating application data according to communication parameters, the system comprising:
   a processor; and
   a memory having computer-executable instructions stored thereon, wherein the computer-executable instructions are configured for:
      associating a plurality of predetermined canned bandwidth profiles with an application, wherein the canned bandwidth profiles are not accessible to a user of the application for modification;
      determining characteristics of an operating system associated with the application data;
      based on the characteristics of the operating system, automatically determining first communication parameters for the application according to a first predetermined canned bandwidth profile, wherein the first canned bandwidth profile is a low bandwidth profile that includes data compression, data decompression, selective part synchronization, reduced data transfer frequency, restricted attachment downloading, and selective transmission;
      communicating the application data according to the determined first communication parameters;
      automatically determining changed characteristics of the operating system associated with the application data;
      based on the changed characteristics of the operating system, automatically determining second communication parameters for the application according to a second predetermined canned bandwidth profile, wherein the second canned bandwidth profile is a high bandwidth profile that includes less data compression than the low canned bandwidth profile, less data decompression than the low canned bandwidth profile, a greater data transfer frequency than the low canned bandwidth profile, less restriction to attachment downloading than the low bandwidth profile, and less restrictions on transmission than the low bandwidth profile; and
      communicating the application data according to the determined second communication parameters.

16. The system of claim 15, wherein the low bandwidth profile includes a selective file synchronization parameter, wherein the selective file synchronization parameter indicates files association with the application data for synchronization.

17. The system of claim 15, wherein the selective part synchronization of the low bandwidth profile indicates a part of a file associated with the application data for synchronization.

18. The system of claim 17, wherein the application is an email application and the selective part synchronization is association with a header of an email of the email application.

19. The system of claim 15, wherein the low bandwidth profile includes a check parameter, wherein the check parameter indicates a frequency of data checking during the communication of the application data.

20. The system of claim 15, wherein the canned bandwidth profiles are accessible to an administrator of the application for modification.

\* \* \* \* \*